(12) United States Patent
Gemme et al.

(10) Patent No.: US 8,916,786 B2
(45) Date of Patent: Dec. 23, 2014

(54) METHOD AND SYSTEM FOR RETROFITTING A CIRCUIT BREAKER

(75) Inventors: Carlo Gemme, Pavia (IT);
Dukkaiappan Subbalahthever, Nashik (IN); Harsha Vaddin, Bellary (IN); Selvakumar Meyappan, Tirunelveli (IN); Ravindra Borse, Nashik (IN)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 13/478,624

(22) Filed: May 23, 2012

(65) Prior Publication Data
US 2012/0228097 A1  Sep. 13, 2012

Related U.S. Application Data (63) Continuation of application No. PCT/IB2010/000590, filed on Mar. 19, 2010.

(30) Foreign Application Priority Data

Nov. 23, 2009 (IN) .......................... 2871/CHE/2009

(51) Int. Cl.
| | |
|---|---|
| H01H 9/20 | (2006.01) |
| H01H 33/20 | (2006.01) |
| H02B 11/00 | (2006.01) |
| H02B 3/00 | (2006.01) |
| H02B 11/04 | (2006.01) |

(52) U.S. Cl.
CPC . *H02B 3/00* (2013.01); *H02B 11/04* (2013.01)
USPC ...................................................... 200/50.23

(58) Field of Classification Search
USPC .......... 200/50.21–50.24, 50.17, 50.25, 50.27, 200/50.34, 50.35, 253.1; 361/605, 606
See application file for complete search history.

(56) References Cited

U.S. PATENT DOCUMENTS

| | | | | |
|---|---|---|---|---|
| 3,002,129 | A * | 9/1961 | Mueller | 361/607 |
| 3,397,293 | A * | 8/1968 | Darrow et al. | 200/50.22 |
| 3,614,350 | A * | 10/1971 | Eichelberger et al. | 200/50.21 |
| 3,958,093 | A * | 5/1976 | Cleaveland | 218/118 |
| 7,124,488 | B2 | 10/2006 | Ford et al. | |
| 7,486,449 | B2 * | 2/2009 | Miyano | 359/781 |
| 7,544,907 | B1 | 6/2009 | Moffat et al. | |

FOREIGN PATENT DOCUMENTS

GB 518723 A 3/1940

OTHER PUBLICATIONS

International Search Report (PCT/ISA/210) issued on Nov. 18, 2010, by the European Patent Office as the International Searching Authority for International Application No. PCT/IB2010/000590.

* cited by examiner

*Primary Examiner* — Renee S Luebke
*Assistant Examiner* — Lheiren Mae A Caroc
(74) *Attorney, Agent, or Firm* — Buchanan Ingersoll & Rooney P.C.

(57) ABSTRACT

A retrofit assembly and method of retrofitting a circuit breaker in a switchgear are described. The retrofit assembly can includes one or more adjustable elements for fitting a circuit breaker into a switchgear panel of the switchgear. The adjustable elements can include a plurality of adjustable modular female tulip contacts to receive a corresponding plurality of male contacts in a panel of the switchgear, each female tulip contact being flexible for a plurality of diameters, a plurality of modular phase adjustment contact arms to provide phase alignment between the poles of the circuit breaker, and/or an adjustable truck for placing the circuit breaker in contact with a rack for the circuit breaker in the switchgear.

9 Claims, 12 Drawing Sheets

METHOD AND SYSTEM FOR RETROFITTING A CIRCUIT BREAKER

RELATED APPLICATION

This application claims priority as a continuation application under 35 U.S.C. §120 to PCT/IB2010/000590, which was filed as an International Application on Mar. 19, 2010 designating the U.S., and which claims priority to Indian Application 2871/CHE/009 filed in India on Nov. 23, 2009. The entire contents of these applications are hereby incorporated by reference in their entireties.

FIELD

The present disclosure relates generally to the field of retrofitting solutions, such as retrofitting of a new circuit breaker into an existing switchgear.

BACKGROUND

Many types of low and medium voltage switchgear systems use power circuit breakers that can be withdrawn for maintenance or for replacement. Power circuit breakers from various manufacturers may not be interchangeable. This leads to a two different problems. One, as the manufacturers eliminate older products and introduce new technologies, the new products have not maintained compatibility with existing switchgears. Secondly, there are no compatible solutions that allow the switchgear panel from one manufacturer to adapt to the circuit breaker from another manufacturer.

The result is that many switchgear installations have power circuit breakers that are costly or impractical to maintain. Complete replacement of switchgear is very expensive and involves significant downtime. In the past, upgrading of obsolete circuit breakers was accomplished by significantly modifying a new circuit breaker to fit into the existing switchgear panel or by modifying the switchgear panel to accept a new breaker.

A retrofitting solution for circuit breaker can involve an extensive engineering to match the existing panel specification with the contacts of a new circuit breaker. This can involve obtaining a wiring diagram for the electrical operation of the breaker, actual dimensions of the original breaker where elevation drawings could be needed, and information and drawings for mechanical interlocks, primary and secondary disconnects, and auxiliary switch operators. This method can be cumbersome as a custom made solution is made for each of the panel.

Another known retrofitting approach is based on adapting a new replacement breaker cradle to the existing switchgear cell by using a "module" or "cradle-within-a-cradle" approach. For example, U.S. Pat. No. 7,124,488 is directed to a system for modifying a circuit breaker for removable installation in a cell of switchgear system, wherein the unmodified circuit breaker is not adapted for mounting in the cell. The system described herein includes an adapter frame to which the circuit breaker is mounted and gear assemblies mounted to opposing sides of the circuit breaker. The gear assemblies adapt a racking device of the circuit breaker so as to be operable to rack the circuit breaker within the cell of the switchgear system. In this method there is rigidity in the design, as only certain panels meeting the dimensions of module can be retrofitted. This also can involve inserting, connecting and supporting the new module or cradle to existing primary and secondary parts inside the switchgear.

Another alternative approach is the "roll in replacement" technique where the existing circuit breaker with truck or cassette, interlocks and wiring is replicated in the new breaker provided with retrofit solution. U.S. Pat. No. 7,544,907 is one exemplary disclosure that utilizes this technique, as this patent discloses a retrofit assembly structured to allow a CM22 type circuit breaker to engage, and be enclosed by, a CMD type circuit breaker tank. The retrofit assembly includes a levering mechanism, a circuit breaker bus assembly having bus support members, and a door handle system structured to allow a user to actuate the circuit breaker contacts when the tank is closed.

These approaches can involve additional space limitations that complicate dielectric and heat run considerations.

Thus the known approaches of custom designing the circuit-breaker or creating a new module with interlocking and auxiliary contact functions, both involve extensive custom design work and materials, and do not provide an optimum retrofitting solution.

It would therefore be desirable to improve the existing retrofit solutions to minimize the reduced assembly operation times and improve flexibility to allow a new circuit breaker to fit into any switchgear panel irrespective of the make and manufacture of the panel.

SUMMARY

A retrofit assembly is disclosed for a circuit breaker in a switchgear, comprising: one or more adjustable elements for fitting a circuit breaker into a switchgear panel of a switchgear, wherein the one or more adjustable elements comprise at least one of a plurality of adjustable modular female tulip contacts to receive a corresponding plurality of male contacts in a panel of the switchgear, each female tulip contact being flexible for a plurality of diameters, a plurality of modular phase adjustment contact arms to provide phase alignment between poles of the circuit breaker, and/or an adjustable truck for placing the circuit breaker in contact with a rack for the circuit breaker in the switchgear.

BRIEF DESCRIPTION OF THE DRAWINGS

These and other features, aspects, and advantages of the present invention will become better understood when the following detailed description is read with reference to the accompanying drawings, wherein.

DETAILED DESCRIPTION

It should be noted that in the detailed description that follows, identical components have the same reference numerals, regardless of whether they are shown in different embodiments. It should also be noted that in order to clearly and concisely disclose exemplary embodiments of the present invention, the drawings may not necessarily be to scale and certain features may be shown in somewhat schematic form.

An exemplary novel retrofit assembly for a circuit breaker to be fitted in a switchgear as described herein includes one or more adjustable elements for fitting the circuit breaker into a switchgear panel of the switchgear. The one or more adjustable elements include at least one of plurality of adjustable modular female tulip contact and/or a plurality of modular phase adjustment contact arms to provide phase alignment between the poles of the circuit breaker and/or an adjustable truck. These elements are adjustable and/or modular, such that they can be fitted to different switchgear panels with ease and provide secure connection for the circuit breaker. This can ensure flexibility for retrofitting the circuit-breaker and reduces manufacturing and assembly operation times. These adjustable elements are described in more detail with reference to the drawings in the forthcoming description.

The term adjustable elements as used herein implies that the elements are configured (constructed and/or assembled) such that they can be adapted as per the switchgear specifications and the elements incorporate different flexible components to provide this adaptability. Also, the term modular as used herein can reference standardized units or dimensions for ensuring flexibility and variety of use.

Figure 1:
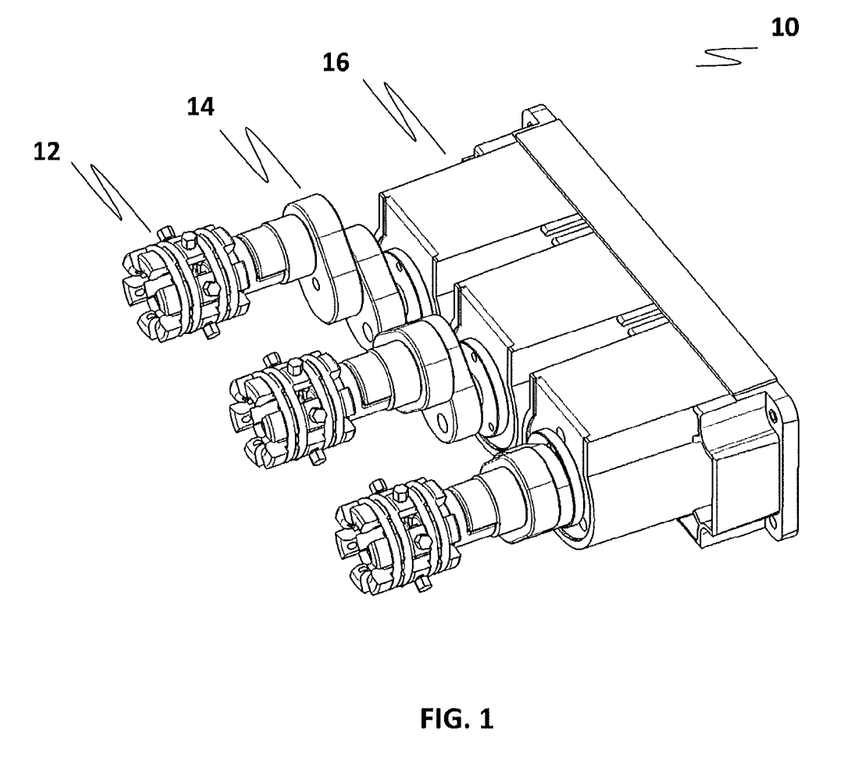
FIG. 1 is a top view of an exemplary retrofit assembly for a circuit breaker that includes adjustable female tulip contacts to be fitted into an existing switchgear panel, according to an exemplary embodiment disclosed herein.

Now turning to drawings, FIG. 1 is a top view of an exemplary retrofit assembly 10 for a circuit breaker to be fitted into an existing switchgear panel. The retrofit assembly can include multiple adjustable modular female tulip contacts 12 to receive a corresponding plurality of male contacts (not shown in FIG. 1) in the panel of the switchgear. In one example, three adjustable modular female contacts are used. Each of the adjustable modular female tulip contacts 12 is attached to a support 16 through a respective modular phase adjustment contact arm 14 to provide phase alignment between the poles of the circuit breaker. The adjustable modular female tulip contacts 12 and the modular phase adjustment contact arms 14 can be advantageous in terms of degree of freedom that can be achieved for special alignment and proper fitting of the new circuit breaker into the existing switchgear panel irrespective of the make and manufacture of the existing switchgear panel. These aspects become clear with the forthcoming description in reference to FIG. 2-11 for different parts of the adjustable modular female tulip contact 12 and in reference to FIG. 12-14 for different parts of the modular phase adjustment contact arm 14.

It should be noted here that the adjustable modular female contacts as described herein can include finite number of definite sizes that are standardized and have flexibility so that the modular female contacts with closest fit/size are selected and adjusted to complete retrofitting.

The adjustable modular female tulip contact can be very useful because it can fit with the primary male contacts of different switchgear panels. It will be known to those skilled in the art that the different switchgear panels can have different male primary contacts. The panel primary male contact can vary for each manufacturer and moreover for different designs even by the same manufacturer. The variation could be due to the design chosen, current carrying capacity, short circuit current, etc. The adjustable modular female tulip contacts described herein can provide a solution to accommodate the different variations of primary male contacts, and are adaptable for both round and flat contacts.

Figure 2:
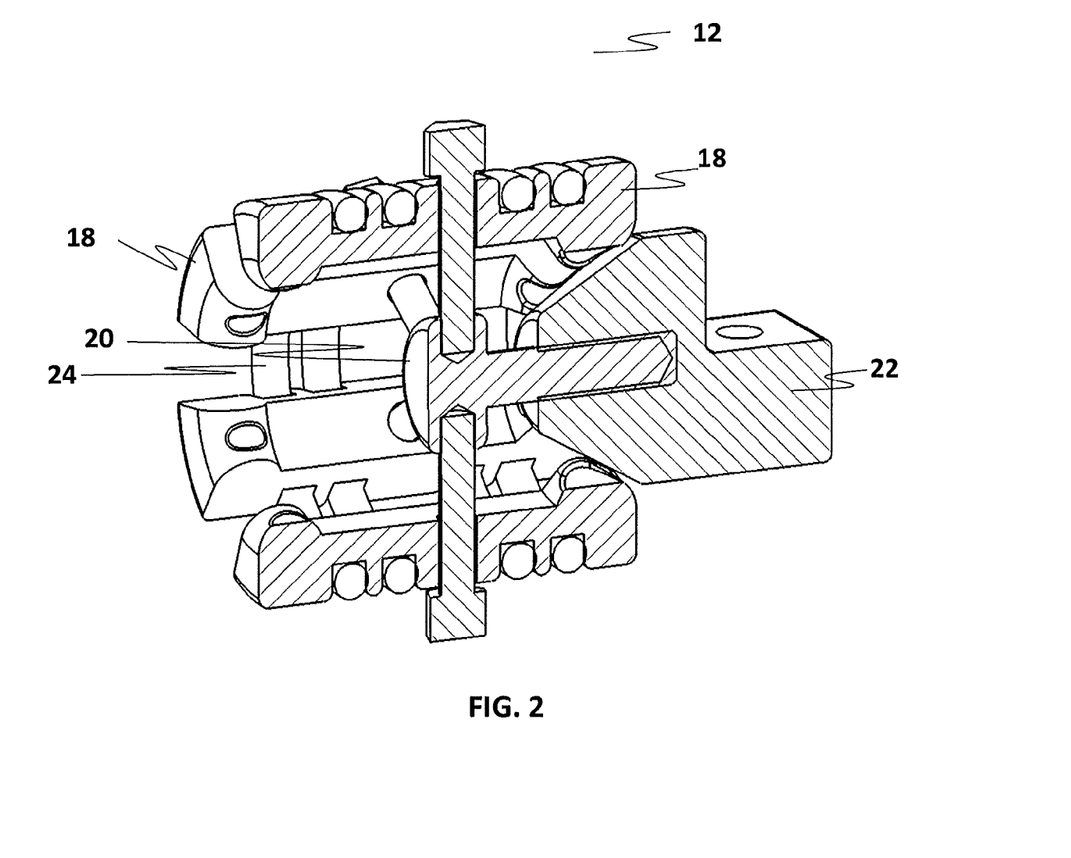
FIG. 2 is a cross-sectional representation of an exemplary female tulip contact that includes multiple modular fingers.

Turning to FIG. 2, a cross-sectional representation of each of the exemplary female tulip contacts 12 is shown that includes multiple modular fingers 18 that are shaped to allow at least two contact points for each finger, a central support part 20, and a rear part 22 to support the plurality of modular fingers. Holding means, such as springs 24, are used to further secure the position of the modular fingers. Leaf springs or any other suitable securing device may also be used for this purpose.

Figure 3A:
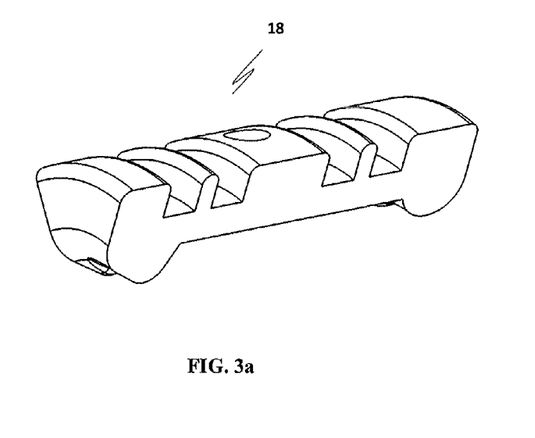
FIG. 3a is a diagrammatic representation of an exemplary single modular finger of the female tulip contact.

FIG. 3a is a diagrammatic representation of a single modular finger 18. As is seen, the modular finger has a particular contour that allows a tulip configuration. It may be noted here that the number of the modular fingers used is based on current rating for the male contact of the switchgear. At the rear-end portion, the finger profile is drafted at given angle.

Figure 3B:
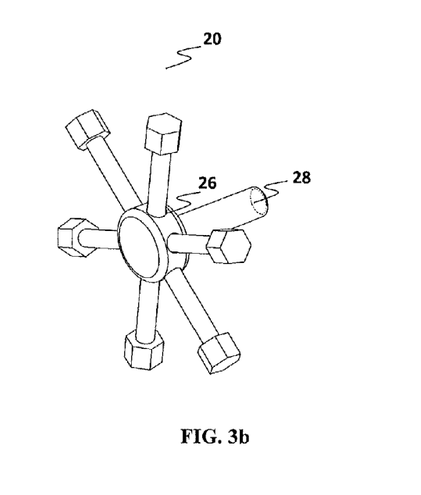
FIG. 3b is a diagrammatic representation of an exemplary central support part for the assembly of the female tulip contacts.

FIG. 3b is a diagrammatic representation of the central support part 20 that includes radial tapped holes 26 at a periphery of the central support part and a projection end 28 extending out from the central support part. In one example the central support part 20 is made of steel.

Figure 3C:
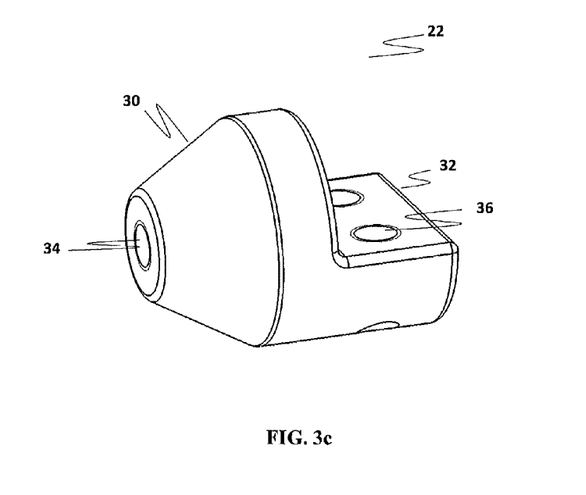
FIG. 3c is a diagrammatic representation of an exemplary rear part for the assembly of the female tulip contact.

FIG. 3c is a diagrammatic representation of the rear part 22 that includes a taper block 30. The taper block 30 can include a central tapped hole 34, and an extension support 32 with one or more tapped holes 36 for fitting at the end contact of the circuit breaker.

Figure 4A:
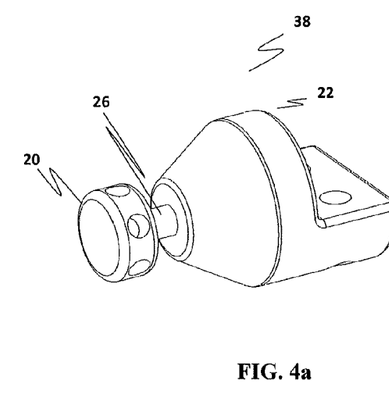
FIGS. 4a-4d are diagrammatic representations to show how an exemplary female tulip contact is assembled.

FIG. 4a is a diagrammatic representation 38 to show how the female tulip contact is assembled. In an exemplary implementation, the central support part 20 and the rear part 22 are taken and screwed together by the screw 26. It should be noted here that the depth of screwing determines the specified pin diameter. A look up chart or any other such means may be used by an operator to select the desired depth of screwing for a chosen pin diameter.

Figure 4B:
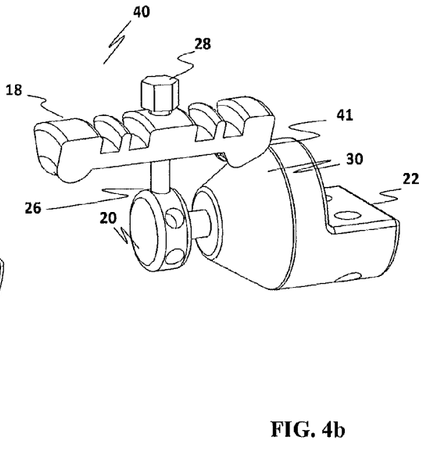

FIG. 4b is a diagrammatic representation 40 for further aspects of assembling the female tulip contact. As is seen in FIG. 4b each modular finger 18 is connected to the central support part 20 via a bolt 28 at each of the radial tapped holes 26 of the central support part. The tapered rear end 41 of the modular finger 18 rest on the tapered rear support 30.

Figure 4C:
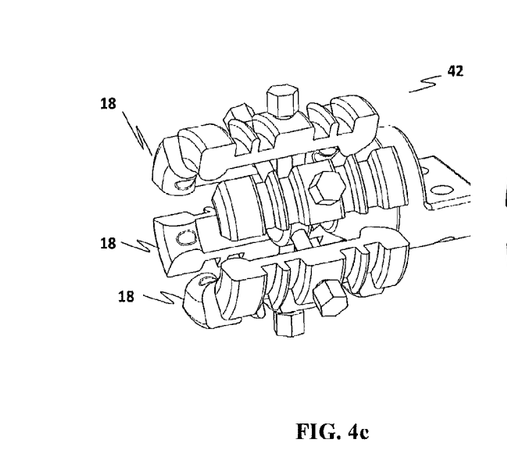

The diagrammatic representation 42 in FIG. 4c depicts the so-far assembled female tulip contact with multiple modular fingers 18.

Figure 4D:
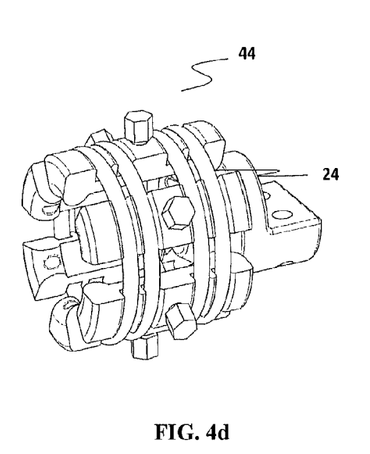

FIG. 4d is a diagrammatic representation 44 of the further assembly aspect where one or more holding means 24 is used to wrap around the multiple modular fingers. In one exemplary implementation the holding means is a spring. In a specific implementation as shown in FIG. 4d, two springs are used in front and two in back. The length of the spring can also determine the contact force that will be generated.

Figure 5A:
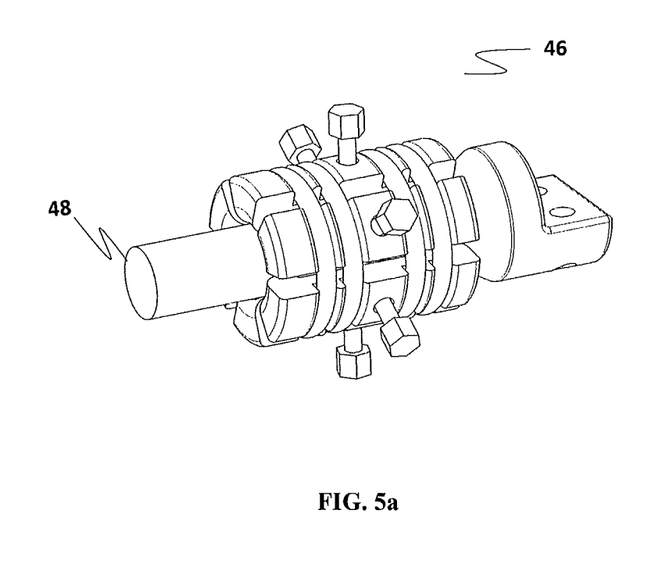
FIG. 5a and FIG. 5b are diagrammatic representations to show an exemplary adjustable female tulip configuration for different pin diameters.
Figure 5B:
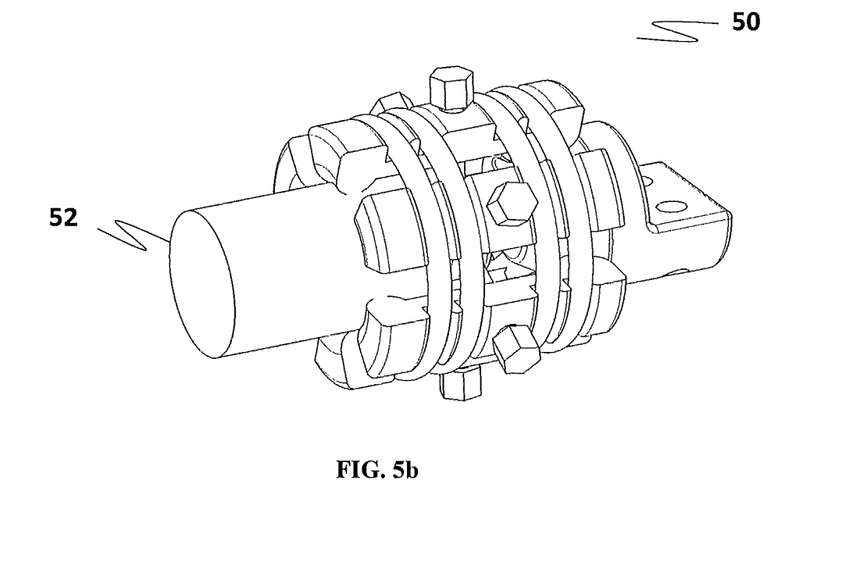

As will be clear from FIGS. 2-4d, the exemplary configuration of the female tulip contact is flexible for different diameters in order to receive the primary male contacts of different diameters. Various configurations are thus possible with the female tulip configuration as described herein. FIG. 5a and FIG. 5b illustrate this aspect, wherein FIG. 5a shows a female tulip configuration 46 for an exemplary pin diameter 30 mm as shown by pin 48. FIG. 5b shows an enlarged pin diameter of about 40 mm for the pin 52 that can be fitted into the expanded female tulip contact 50.

Figure 6A:
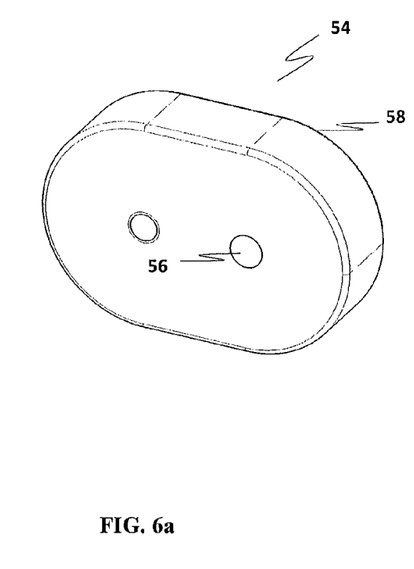
FIGS. 6a-6c are diagrammatic representations for an exemplary modular phase adjustment contact arm that provides phase alignment between the poles of the circuit breaker according to another exemplary embodiment disclosed herein.
Figure 6B:
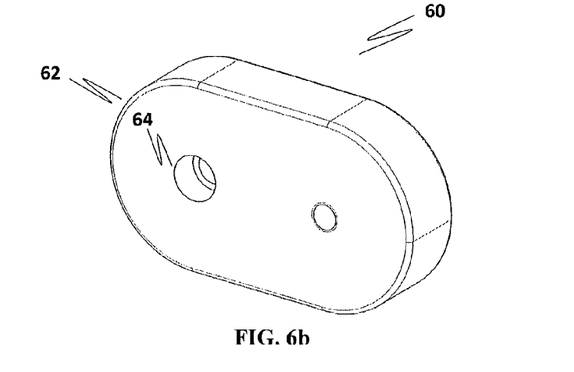
Figure 6C:
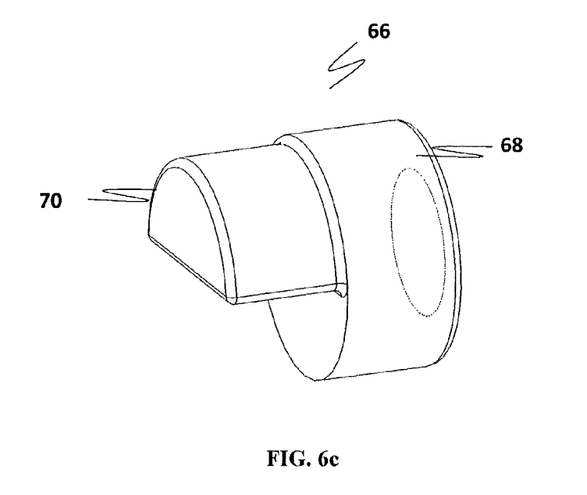

FIG. 6a-6c describe the next component of the retrofit assembly that is adjustable, wherein the modular phase adjustment contact arm provides specified phase alignment between the poles of the circuit breaker. The modular phase adjustment contact arm utilizes the variable radius geometry by providing radial parts with different rotating points, such that they cover and reach all the points in a given space. This leads to a simpler configuration for a contact arm which can be configured on site and also adjusted to mate with the existing contacts inside the switchgear panel without much design work. FIG. 6a is a diagrammatic representation of the base part 54 of the modular phase adjustment contact arm that is configured to freely rotate about a rest point 56 at a pole of the circuit breaker plug. The contact area provided by the base part ensures that the specified current can be handled. The base part also includes a tap hole 58 to receive a forward part shown in FIG. 6b. FIG. 6b is a diagrammatic representation of the forward part 60 configured to rest on the base part at a point of contact 62 and configured to rotate in a plane over the base part. The forwards part also has a hole 64 to secure it to the base part and an extension arm shown in FIG. 6c. FIG. 6c is a diagrammatic representation of an extension arm 66 configured to rest at 68 on the forward part and to receive at the protruded portion 70, an end contact of the pole of circuit breaker.

In an exemplary implementation, the assembly of the modular phase adjustment contact arm involves lightly screwing the base part and the forward parts, and rotating each to the specified orientation. Next the extension arm is mounted on the forward part. Finally when a desired horizontal and vertical dimension are reached, the components are tightly screwed. In one example the assembly can be done over a variable jig also. Thus the contact arm can advantageously orient itself to the specified configuration and dimension inside the switchgear panel, and moreover add flexibility to do the phase adjustment on the site in a simple manner.

Figure 7:
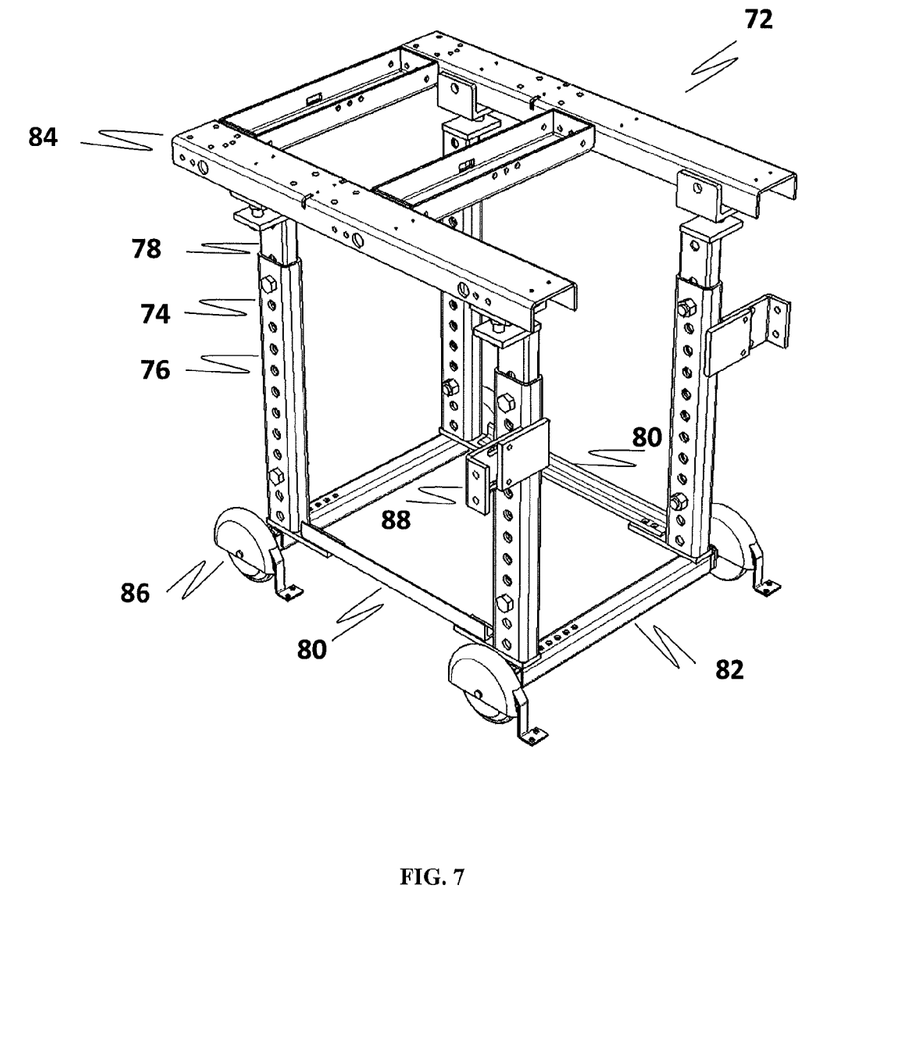
FIGS. 7-12 are diagrammatic representations for different adjustable features for an adjustable truck according to yet another exemplary embodiment disclosed herein.

The retrofit assembly can include an adjustable truck 72 as shown in FIG. 7 for placing the circuit breaker in contact with a rack for the circuit breaker in the switchgear panel. The adjustable truck supports the circuit breaker and positions, and orients it to the desired location inside the switchgear panel. The adjustable truck can include adjustment means to change the height, width, depth, and also planar adjustment means for proper alignment of circuit breaker. Additionally, it can include locking means to lock the truck after it is in the right position in the switchgear panel.

FIG. 7 shows vertical adjustment tubes 76 and 78 configured for telescopic movement to form a vertical support 74 that is adjustable for varying heights. The height adjustment is achieved due to the telescopic movement of the vertical adjustment tubes 76 and 78. Telescopic movement as used herein implies that the tubes 76 and 78 can move in and out of each other. Once the desirable vertical height is achieved the tubes 76 and 78 are screwed to form the vertical support 74. For horizontal adjustment at least two horizontal adjustment angles 80 can be provided. For depth adjustment, tubes 82 are provided. For planar adjustment, channels 84 are provided on the top portion of the truck 72. At least two wheels 86 are provided at the base of each horizontal adjustment tube, which include a locking mechanism. An additional locking mechanism is provided by the L-shaped brackets 88, each attached to the vertical support. The two side brackets are extendable to lock the truck at top end. Some of these different parts of the truck 72 are described in more detail in subsequent figures and associated description.

Figure 8:
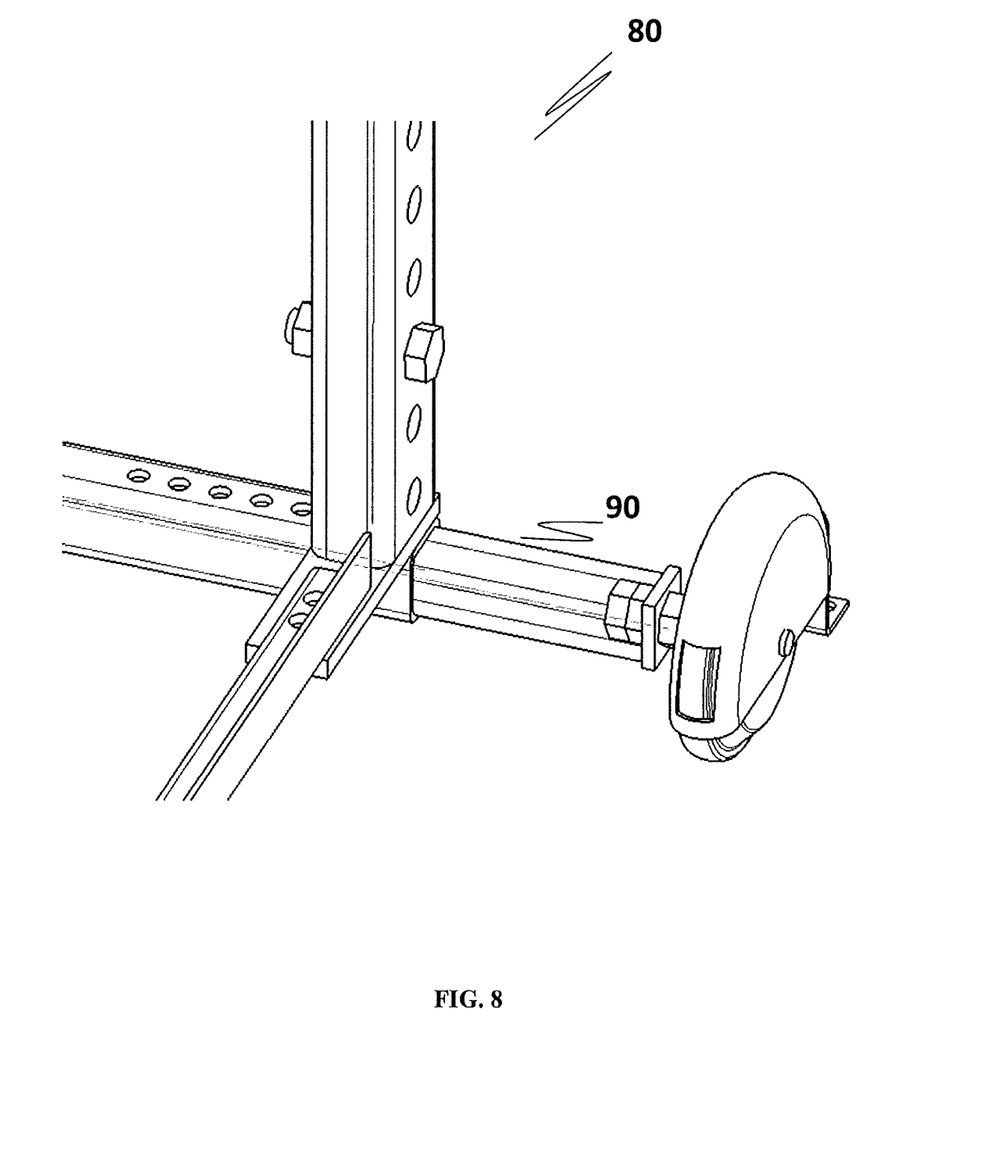
Figure 9:
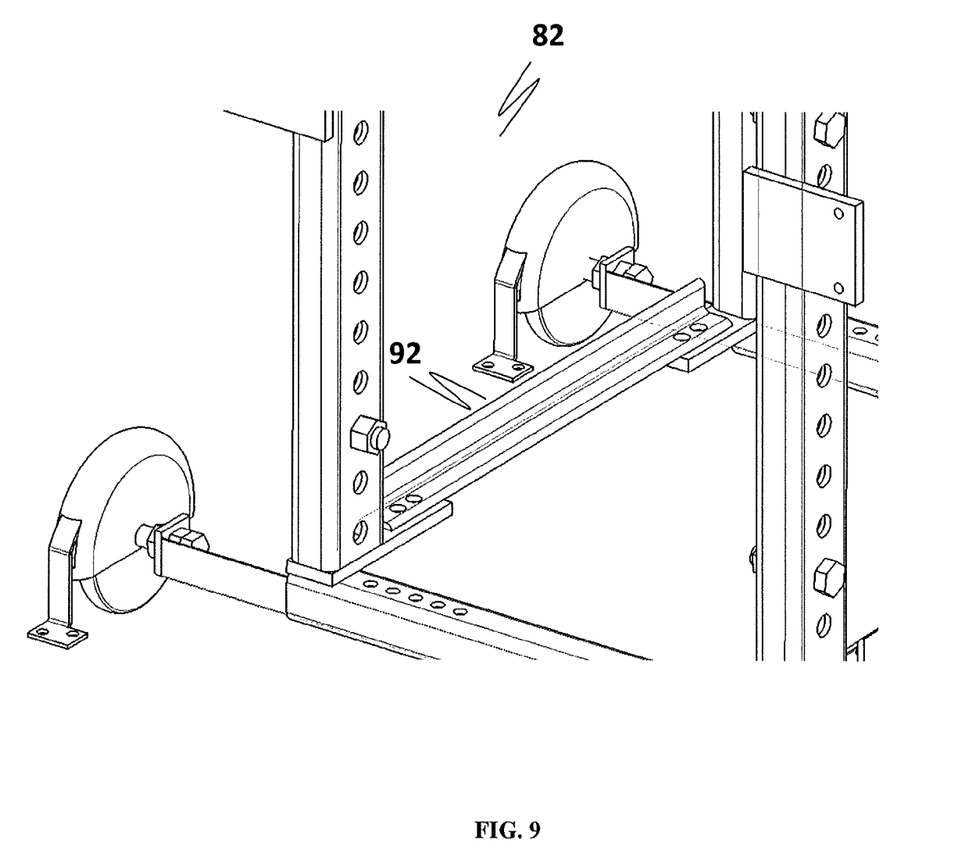

FIG. 8 is a diagrammatic representation for the horizontal adjustment angles 80. The horizontal adjustment angles 80 include a holed angle 90 that is configured to move in and out to provide horizontal adjustable distance. Once the specified distance is achieved, the angle can be bolted in place. This mechanism can lead to a stepwise increase or decrease in the horizontal adjustment. For finer adjustment, the wheels may be used, for example, a screw may be mounted on an end support of the angle 90 and relative tightening of nuts provided at the wheels will allow the wheel to move in or out. Once the specified position is reached, the bolts can be tightened to hold it. In another alternative, wheels can be mounted below the horizontal adjustment tube 80 and can be moved in slot to provide fine horizontal adjustment. FIG. 9 is a diagrammatic representation for depth adjustment means 82 that include angles 92 of varying cut lengths to provide depth adjustment.

Figure 10:
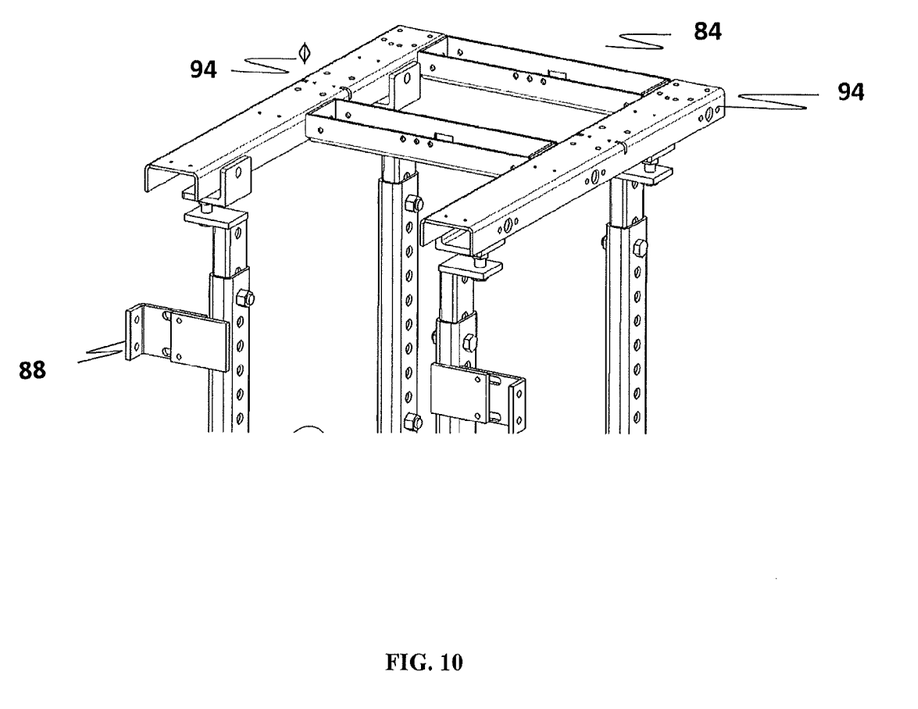

FIG. 10 is a diagrammatic representation for planar adjustment means 84 that include at least two top end planar adjustment connectors 94 that can be configured to move up and down, independently, to adjust a planarity of the truck. At the site sometimes the switchgears are damaged if they are in a tilted position, hence the planar adjustment is very useful to avoid such a situation.

Figure 11:
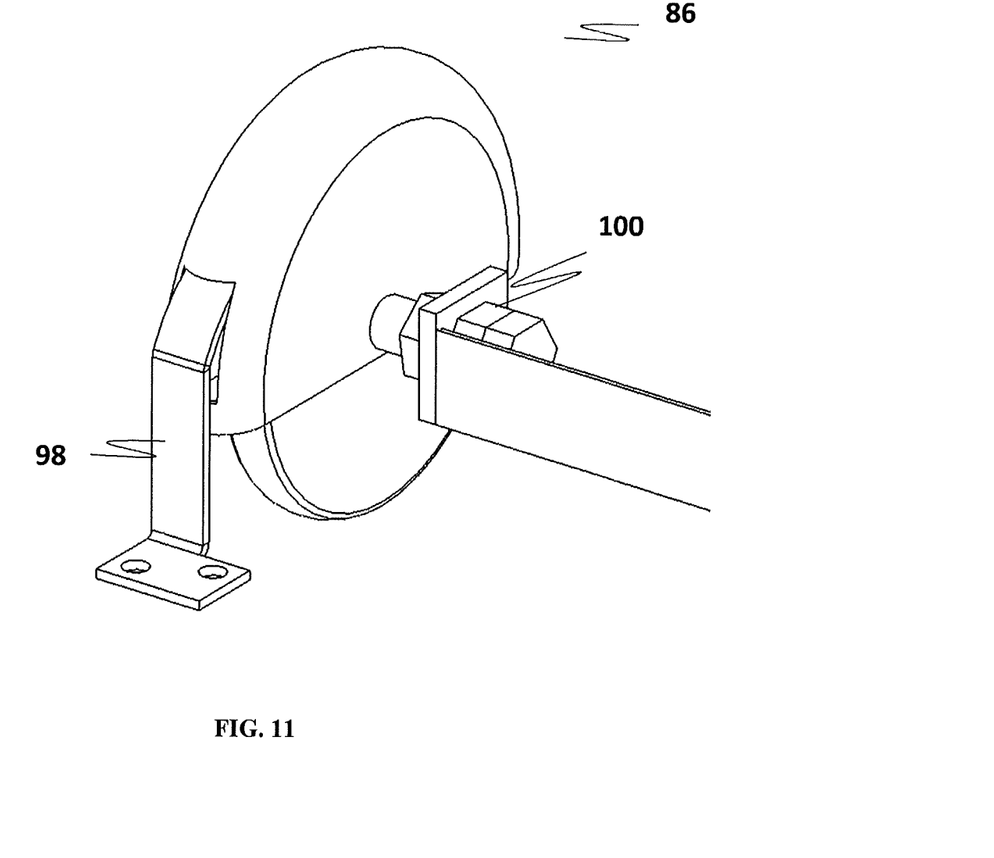

FIG. 11 is a diagrammatic representation for the wheel 86 with a locking device 98 to stop movement of the truck inside the panel. The wheels are stopped from rotating by friction of the locking device 98. Further fine adjustment for locking may also be provided by means of screws and nuts 100, or other suitable locking device, at the base of the switchgear panel by a self tapping screw or by any other holding mechanism.

Figure 12:
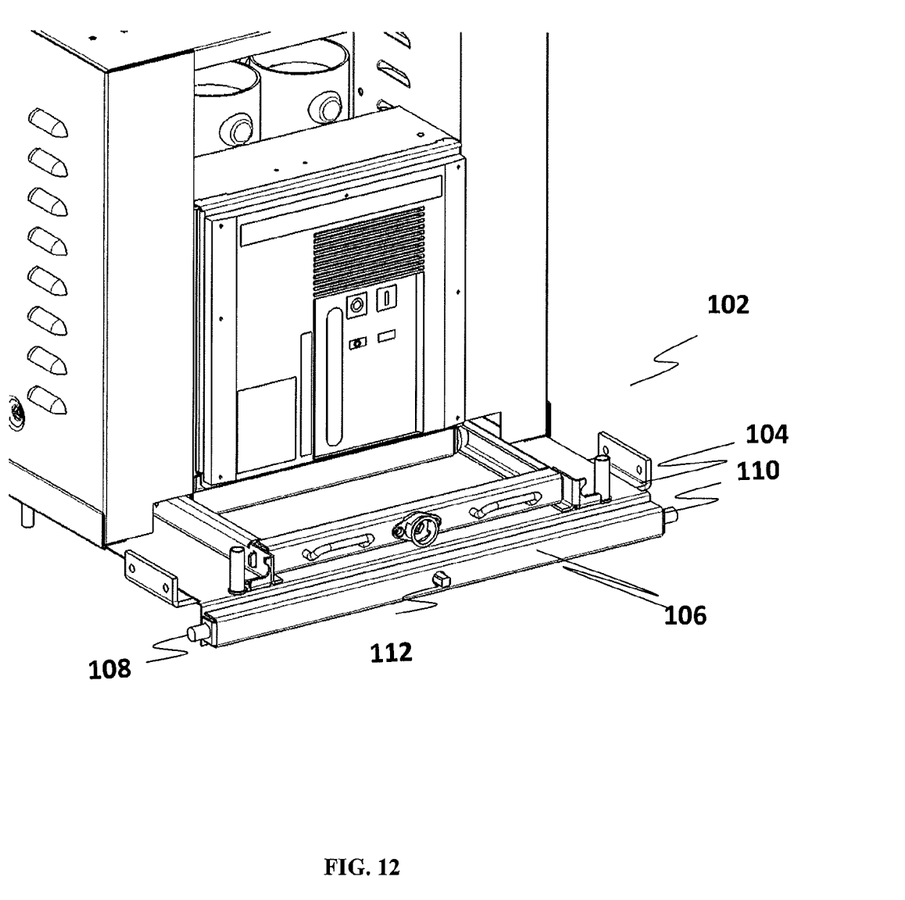

FIG. 12 is a diagrammatic representation 102 for another locking arrangement that allows a secure attachment for a front-end panel 106 to be attached to a base of the rack 104 for the circuit breaker. The front-end panel 106 has two extending pins 108 and 110 to engage with the at least the two side brackets fitted at the switchgear (side brackets 88, shown in FIG. 7) to provide secure locking of the truck with the rack. The two extending pins 108 and 110 can be adjusted by the movement of the pin 112 (in one example the movement can be clock-wise and counter-clockwise) on the panel 106.

The adjustable truck described herein can be easily guided in the rail of the switchgear panel, and provide adjustment in all three directions. The adjustable truck can be made suitable to any kind of switchgear panel due to a kit like design which can be assembled at the site.

The system and techniques described herein can provide a reduction in maintenance and repair costs towards retrofitting a circuit breaker such that a new circuit breaker can be fitted quickly, easily and safely into an existing switchgear panel. The invention also can improve manufacturability, as the manufacturer can now manufacture individual components in mass scale for retrofitting. As it will be appreciated by those skilled in the art, the manufacturer can manufacture a select number of standardized/fixed size components with flexibility as a means to achieve the desirable retrofitting solutions. The retrofitting process as a whole an be streamlined with the above adjustable and/or modular features impacting time to provide the service swiftly. The retrofitting solutions described herein can therefore be implemented on-site because of the streamlined process and adjustable and/or modular features. While only certain features have been illustrated and described herein, many modifications and changes will occur by those skilled in the art. It is, therefore, to be understood that the appended claims are intended to cover all such modifications and changes as fall within the true spirit of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A retrofit assembly for a circuit breaker in a switchgear, comprising:
   one or more adjustable elements for fitting a circuit breaker into a switchgear panel of a switchgear, wherein the one or more adjustable elements comprise:
      a plurality of adjustable modular female tulip contacts to receive a corresponding plurality of male contacts in a panel of the switchgear, each female tulip contact being flexible for a plurality of diameters; and
      a plurality of modular phase adjustment contact arms to provide phase alignment between poles of the circuit breaker,
   wherein each adjustable modular female tulip contact comprises:
      a plurality of modular fingers shaped to allow at least two contact points for each finger;
      a central support part having radial tapped holes at a periphery of the central support part and a projection end extending out from the central support part; and
      a rear part having a taper block to support the plurality of modular fingers, the taper block having a central tapped hole to receive the projection end of the central support part, and an extension support with one or more tapped holes for fitting at the end contact of the circuit breaker.

2. The retrofit assembly of claim 1, wherein each finger of the plurality of the modular fingers is connected to the central support part via a bolt at each of the radial tapped holes of the central support part.

3. The retrofit assembly of claim 1, wherein a number for the plurality of modular fingers is based on current rating of the male contact of the switchgear.

4. The retrofit assembly of claim 1, comprising:
   one or more holding means to wrap around the plurality of modular fingers.

5. The retrofit assembly of claim 4, wherein the holding means is a spring.

6. A retrofit assembly for a circuit breaker in a switchgear, comprising:
   one or more adjustable elements for fitting a circuit breaker into a switchgear panel of a switchgear, wherein the one or more adjustable elements comprise:
      a plurality of adjustable modular female tulip contacts to receive a corresponding plurality of male contacts in a panel of the switchgear, each female tulip contact being flexible for a plurality of diameters, and
      a plurality of modular phase adjustment contact arms to provide phase alignment between poles of the circuit breaker,
   wherein each of the plurality of modular phase adjustment contact arms, comprises:
      a base part configured to freely rotate about a rest point at a pole of the circuit breaker;
      a forward part configured to rest on the base part and configured to rotate in a plane over the base part; and
      an extension arm configured to rest on the forward part and to receive an end contact of the pole of circuit breaker.

7. A retrofit assembly for a circuit breaker in a switchgear, comprising:
   one or more adjustable elements for fitting a circuit breaker into a switchgear panel of a switchgear, wherein the one or more adjustable elements comprise:
      a plurality of adjustable modular female tulip contacts to receive a corresponding plurality of male contacts in a panel of the switchgear, each female tulip contact being flexible for a plurality of diameters;
      a plurality of modular phase adjustment contact arms to provide phase alignment between poles of the circuit breaker;
   an adjustable truck for placing the circuit breaker in contact with a rack for the circuit breaker in the switchgear;
   a plurality of vertical adjustment tubes configured for telescopic movement to form a vertical support adjustable for varying heights;
   at least two horizontal adjustment tubes with a holed angle that is configured to move in and out to provide horizontal adjustable distance;
   a plurality of angles of varying cut lengths to provide depth adjustment;
   at least two top end planar adjustment connectors configured to move up and down to adjust a planarity of the truck; and
   at least two wheels at the base of each horizontal adjustment tube with a locking device to stop movement of the truck inside the panel.

8. The retrofit assembly of claim 7, comprising:
   at least two side brackets, each attached to a vertical support, the at least two side brackets being extendable to lock the truck at top end.

9. The retrofit assembly of claim 8, comprising:
   a front-end panel to be attached to a base of the rack for the circuit breaker, the front-end panel having two extending pins to engage with the at least two side brackets to provide secure locking of the truck with the rack.

* * * * *